Jan. 15, 1957     M. D. WELSH     2,777,706
COMBINED BABY CARRIAGE, BASSINET AND STROLLER
Filed June 25, 1954     3 Sheets-Sheet 1
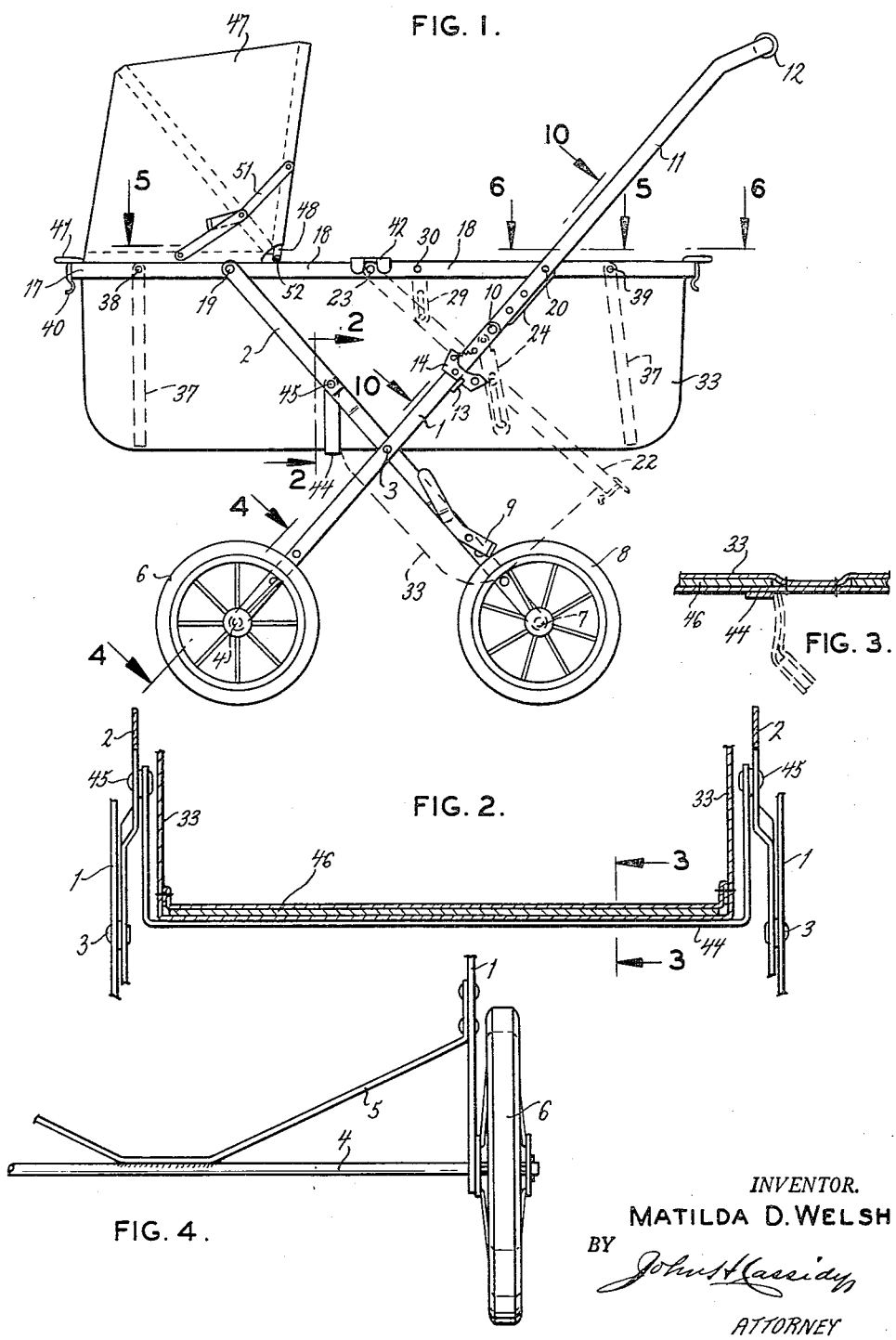
INVENTOR.
MATILDA D. WELSH
BY
John H. Cassidy
ATTORNEY Jan. 15, 1957 M. D. WELSH 2,777,706
COMBINED BABY CARRIAGE, BASSINET AND STROLLER
Filed June 25, 1954 3 Sheets-Sheet 2
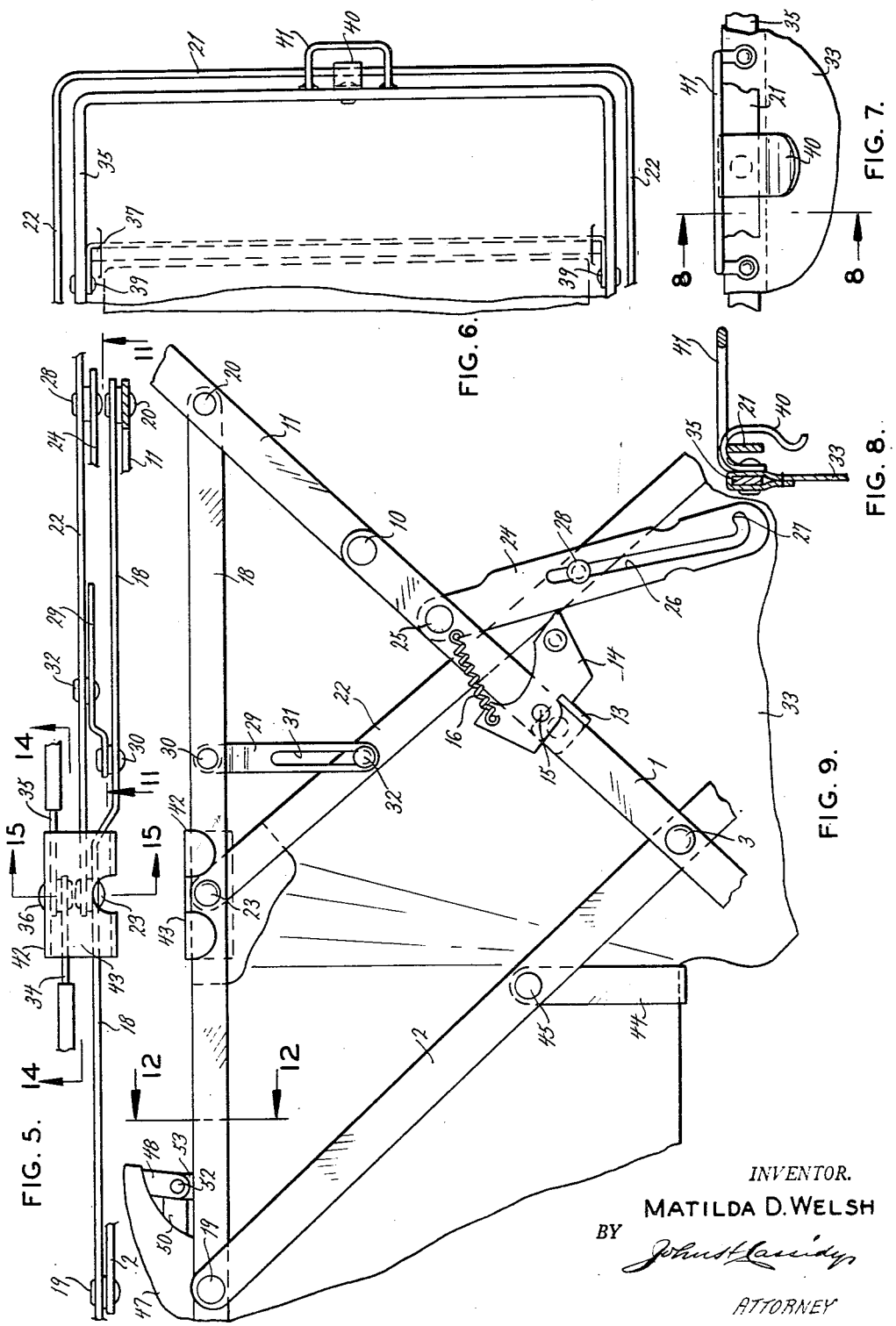
INVENTOR.
MATILDA D. WELSH
BY
*John H. Cassidy*
ATTORNEY Jan. 15, 1957  M. D. WELSH  2,777,706
COMBINED BABY CARRIAGE, BASSINET AND STROLLER
Filed June 25, 1954  3 Sheets-Sheet 3
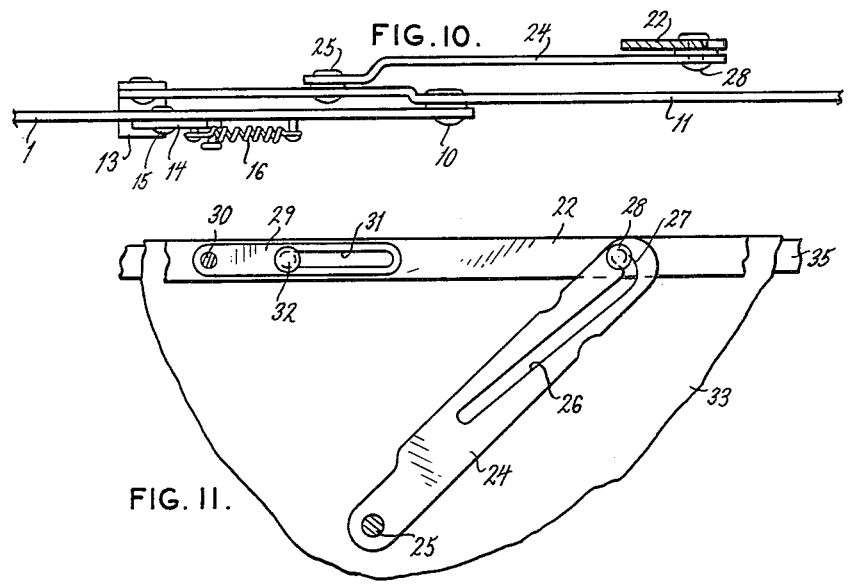
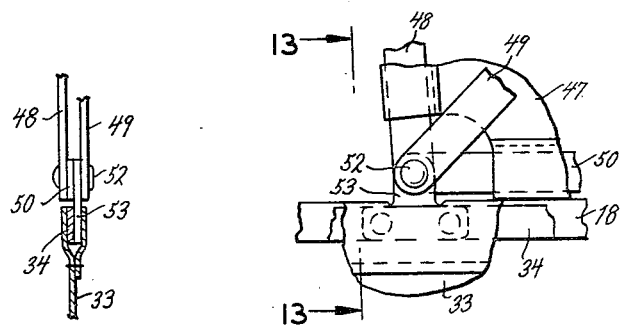
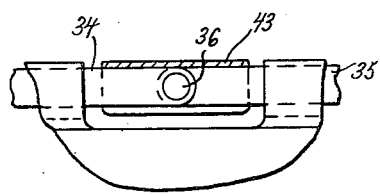
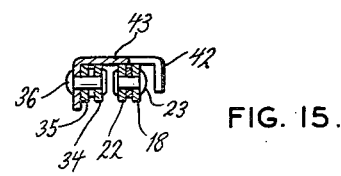
INVENTOR.
MATILDA D. WELSH
BY
ATTORNEY

United States Patent Office 2,777,706
Patented Jan. 15, 1957

2,777,706

COMBINED BABY CARRIAGE, BASSINET AND STROLLER

Matilda D. Welsh, Ladue, Mo.

Application June 25, 1954, Serial No. 439,180

9 Claims. (Cl. 280—31)

This invention pertains to baby carriages, and more particularly to the type which is convertible from the ordinary carriage type to the stroller type.

An object of this invention is to provide a structure which is easily convertible from one type to another, and which will be strong and stable in either adjustment.

Another object is to provide in combination with such a structure, a separate bassinet which may be removed from the carriage structure and used by itself, and which when combined with the carriage structure is convertible therewith to either type.

In accordance with this invention, generally stated, a chassis structure is provided, having a pivoted end frame portion which may be lowered from the horizontal position. A separate bassinet has its own top frame which is jointed at its middle side portions. The bassinet is removably mounted on the chassis with the joints in its frame aligned with those of the end frame of the chassis so that when the latter is lowered, the adjacent portion of the bassinet may also be lowered, the joints being supported by the chassis so that in its lowered position, that part of the bassinet provides a leg rest, and the carriage as a whole may be operated as a stroller.

A preferred embodiment of this invention is illustrated in the accompanying drawings, in which—

Fig. 1 is a side view of a baby carriage embodying this invention;

Fig. 2 is an enlarged section on line 2—2 of Fig. 1;

Fig. 3 is a detail section on line 3—3 of Fig. 2;

Fig. 4 is a partial section, enlarged, on line 4—4 of Fig. 1;

Fig. 5 is an enlarged detail section on line 5—5 of Fig. 1;

Fig. 6 is an enlarged section on line 6—6 of Fig. 1;

Fig. 7 is a right-hand end view of a part of Fig. 6 showing the means for supporting the bassinet;

Fig. 8 is a section on line 8—8 of Fig. 7;

Fig. 9 is an enlarged side view of a part of the chassis, showing the pivoted end frame in lowered position;

Fig. 10 is an enlarged detail section on line 10—10 of Fig. 1;

Fig. 11 is a detail taken from the same viewpoint as Fig. 9, showing the means of supporting the end frame in horizontal position;

Fig. 12 is a detail side view of the hood mounting;

Fig. 13 is a section on line 13—13 of Fig. 12;

Fig. 14 is a section on line 14—14 of Fig. 5; and

Fig. 15 is a section on line 15—15 of Fig. 5.

Referring to the drawing, the chassis of the carriage comprises a pair of scissor bars 1 and 2 pivoted to each other at 3, this structure being duplicated on the opposite side of the carriage. The scissor bars 1 on opposite sides of the carriage have mounted therein at their lower ends an axle 4 braced to the chassis by braces 5 and carrying at their ends front road wheels 6. Similarly, the scissor bars 2 carry an axle 7 on which are mounted rear wheels 8. A brake 9 may be provided.

Pivoted to the scissor bars 1 by a pin 10 is a handle-bar 11. The two handle-bars on opposite sides of the carriage may be connected by a pusher-grip 12. The lower end of the handle-bar 11 extends beyond the pin 10 and has mounted at its lower end an angle piece 13 adapted to be engaged by a latch 14 pivoted at 15 on the bar 1 and tensioned by a spring 16. The chassis has a horizontal frame comprising a front end bow 17 and side frame members 18, only one of which appears in the drawing. The scissor bar 2 is pivoted to the horizontal frame member 18 at 19. The handle-bar 11 is pivoted to the rear end of the same frame member at 20.

The structure just described provides a foldable chassis so that the carriage may be folded when not in use. In order to fold the same, the latch 14 is disengaged from the angle piece 13 so that the handle-bar 11 may be swung on the pivot 20. This movement carries the pivot pin 10 toward the right of Fig. 9, thereby spreading the upper ends of the scissor bars 1 and 2 and folding the upper end of the handle-bar 11 toward the left of Fig. 9, and down upon the upper part of the frame 17, 18.

The rear portion of the chassis frame comprises a member consisting of a rear end bow 21 and side members 22. Each of these side members is pivoted at its front end by a pin 23 to the horizontal frame member 18 at substantially its middle. In order to support this end frame in its horizontal position, a strut 24 is pivoted at 25 to the handle-bar 11. This strut is formed with a longitudinal slot 26 terminating in a hook at 27. A pin 28 on the end frame 22 is slidably engaged in the slot 26 so that when the end frame is raised to horizontal position, the pin 28 sliding along the slot 26 will finally be engaged in the hook portion 27. This occurs with the strut 24 in its upper position, as shown in Fig. 1. The strut then supports the end frame in this horizontal position. When the end frame is to be lowered, the pin 28 is disengaged from the hook portion 27 and moved along the slot 26 by lowering the frame 22. A link 29 pivoted at 30 to the frame member 18 is formed with a slot 31 engaging a pin 32 on the end frame 22. As the end frame 22 swings on its pivot 23, the pin 32 moves along the slot 31. When said pin reaches the outer end of said slot, the frame 22 is arrested in its lowered position, as shown in Fig. 9. When the frame 22 is swung to its horizontal position, the pin 32 moves to the inner end of the slot 31 and the link assumes a horizontal position between the frame members 22 and 18, as shown in Fig. 5.

A separate bassinet is provided, formed with a body portion 33 and an upper frame comprising a pair of end bows 34 and 35, pivoted to each other at their middle portions 36. End loops 37 pivoted to the end bows 34 and 35 at 38 and 39, respectively, may be let down to the positions shown in dotted lines in Fig. 1 to keep the body portion 33 extended. The bassinet frame is provided at the ends of the frames 34 and 35 with supporting clips 40 adapted to rest upon the end bows 17 and 21 to support the ends of the bassinet frame. These ends are also provided with handles 41 whereby the bassinet may be handled in lifting it out of chassis.

Secured to the bassinet frame by the pivot pins 36 at each of the joints on opposite sides of the frame is a bracket 42 having a top plate 43 which, when the frame members 34 and 35 are extended, is in contact with their upper edges. This engagement prevents said frame members from flexing upward on the pin 36, as seen in Fig. 14. Accordingly, when the bassinet is lifted by means of the handles 41, the frame thereof remains stiff. The top plate 43 extends outward from the sides of the bassinet frame far enough to overlap and rest upon the horizontal frame member 18, and the spacing is such that the pivot pins 36 are aligned with the pivot pins 23 of the chassis. Accordingly, when the rear frame 22 of the chassis is lowered on its pivot pins 23, as shown in Fig. 9, the rear portion of the bassinet will move downward with it to the position shown in dotted lines in Fig. 1. In this position, it forms a leg rest for the child seated upon the horizontal portion of the bottom of the bassinet. In order that this portion may remain in horizontal position, a rigid loop 44 pivoted at its ends at 45 to the scissor bar 2 extends under this part of the body portion 33 from one side to the other of the carriage and sustains this portion in horizontal position to provide a seat 46.

A hood 47 having collapsible frame members 48, 49 and 50, held in position by an extending toggle 51, may be pivoted at 52 to a suitable bracket 53 on the frame member 18.

Various changes may be made in the details of construction, within the scope of the appended claims, without departing from the spirit of this invention. Parts of the invention may be used without the whole and improvements may be added while retaining some or all of the advantages of the invention.

I claim:

1. A baby carriage of the character described, comprising, a foldable chassis including pivotally connected scissor bars, a rigid horizontal frame member formed with a front end-bow and supported by said bars, and an end frame formed with a rear end-bow and having a pivotal joint with said frame member; a bassinet having a frame jointed for downward movement of part thereof, and means removably mounting said bassinet frame on said chassis with its joint aligned with said pivotal joint of said frame member, whereby said aligned joints accommodate downward movement of said end frame and said part of said bassinet frame to position the lowered part of the bassinet as a leg rest for the child.

2. A baby carriage of the character described, comprising, a foldable chassis including pivotally connected scissor bars, a rigid horizontal frame member formed with a front end-bow and supported by said bars, and an end frame formed with a rear end-bow and having a pivotal joint with said frame member; a bassinet having a frame jointed for downward movement of part thereof, brackets attached to said bassinet frame at the joints thereof and in supporting engagement with the side portions of said chassis, and means removably supporting the ends of said bassinet frame on said end-bows of said chassis.

3. A baby carriage of the character described, comprising, a foldable chassis including pivotally connected scissor bars, a rigid horizontal frame member formed with a front end-bow and supported by said bars, and an end frame formed with a rear end-bow and having a pivotal joint with said frame member; a bassinet having a frame jointed for downward movement of part thereof, brackets attached to said bassinet frame at the joints thereof to extend outward therefrom to rest upon said chassis at said pivotal joint of said frame member, and means removably supporting the ends of said bassinet frame on said end-bows of said chassis.

4. A baby carriage of the character described, comprising, a foldable chassis including pivotally connected scissor bars, a rigid horizontal frame member formed with a front end-bow and supported by said bars, an end frame formed with a rear end-bow and having a pivotal joint with said frame member for downward movement relative thereto, a link pivotally connected with said frame member and having a pin-and-slot connection with said end frame to limit the downward movement thereof, a strut pivotally connected to one of said scissor bars and having a hooked slot, and a pin on said end frame slidably engaging said slot and engageable in the hook thereof to support said end frame in horizontal position; and a separate bassinet having a jointed frame supported on said chassis for downward movement of part thereof with said end frame.

5. A baby carriage of the character described, comprising, a foldable chassis including pivotally connected scissor bars, a rigid horizontal frame member formed with a front end-bow and supported by said bars, and an end frame formed with a rear end-bow and having a pivotal joint with said frame member; a bassinet having a frame jointed for downward movement of part thereof, means removably mounting said bassinet frame on said chassis with its joint aligned with said pivotal joint of said frame member, whereby said aligned joints accommodate downward movement of said end frame and said part of said bassinet frame to position the lowered part of the bassinet as a leg rest for the child, and a rigid loop supported on one of said scissor bars and passing under the seat portion of said bassinet to support the same in horizontal position.

6. A baby carriage of the character described, comprising, a foldable chassis including pivotally connected scissor bars, a rigid horizontal frame member formed with a front end-bow and supported by said bars, an end frame formed with a rear end-bow and having a pivotal joint with said frame member for downward movement relative thereto, a link pivotally connected with said frame member and having a pin-and-slot connection with said end frame to limit the downward movement thereof, a strut pivotally connected to one of said scissor bars and having a hooked slot, a pin on said end frame slidably engaging said slot and engageable in the hook thereof to support said end frame in horizontal position; and a separate bassinet having a jointed frame supported on said chassis for downward movement of part thereof with said end frame, and a rigid loop supported on the other of said scissor bars and passing under the seat portion of said bassinet to support the same in horizontal position.

7. A baby carriage of the character described, comprising, a foldable chassis including pivotally connected scissor bars, a horizontal frame supported on said chassis, said frame being jointed adjacent its middle, a separate bassinet having an upper frame jointed near its middle, and means for removably mounting said bassinet on said horizontal frame with their joints substantially in alignment with each other whereby the end portions of said frames may be lowered together to position the lowered portion of said bassinet as a leg rest.

8. A baby carriage according to claim 7 having a rigid loop member pivoted on said chassis and extending under the middle portion of the bassinet to support the same when the end portion is lowered.

9. A baby carriage according to claim 7 having rigid end loops pivoted to the bassinet frame and positionable to extend downward therefrom to keep the bassinet distended.

References Cited in the file of this patent
UNITED STATES PATENTS

| | | |
|---|---|---|
| 1,631,498 | Melniker et al. | June 7, 1927 |
| 1,721,178 | Collier | July 16, 1929 |
| 2,013,910 | Burst | Sept. 10, 1935 |
| 2,171,013 | Stinson | Aug. 29, 1939 |
| 2,277,583 | Feldman | Mar. 24, 1942 |
| 2,646,286 | Troendle | July 21, 1953 |